US012175107B2

(12) United States Patent
Wang et al.

(10) Patent No.: US 12,175,107 B2
(45) Date of Patent: Dec. 24, 2024

(54) METHOD, ELECTRONIC DEVICE AND COMPUTER PROGRAM PRODUCT FOR PROCESSING DATA

(71) Applicant: Dell Products L.P., Round Rock, TX (US)

(72) Inventors: Sheng Wang, Beijing (CN); Dapeng Chi, Beijing (CN); Zhiping An, Beijing (CN); Ming Zhang, Beijing (CN)

(73) Assignee: Dell Products L.P., Round Rock, TX (US)

( * ) Notice: Subject to any disclaimer, the term of this patent is extended or adjusted under 35 U.S.C. 154(b) by 150 days.

(21) Appl. No.: 17/993,263

(22) Filed: Nov. 23, 2022

(65) Prior Publication Data

US 2023/0342054 A1 Oct. 26, 2023

(30) Foreign Application Priority Data

Apr. 22, 2022 (CN) ......................... 202210431612.0

(51) Int. Cl.
*G06F 3/06* (2006.01)

(52) U.S. Cl.
CPC ............ *G06F 3/064* (2013.01); *G06F 3/0611* (2013.01); *G06F 3/0622* (2013.01); *G06F 3/0679* (2013.01)

(58) Field of Classification Search
CPC ....... G06F 3/064; G06F 3/0611; G06F 3/0622
See application file for complete search history.

(56) References Cited

U.S. PATENT DOCUMENTS 6,976,187 B2 * 12/2005 Arnott ................. G06F 11/1076 714/E11.034
11,061,618 B1 * 7/2021 Glimcher ............ G06F 16/2379
11,216,198 B2 1/2022 Gao et al.
11,366,608 B2 6/2022 Kang et al.
11,429,293 B1 8/2022 Vankamamidi et al.
11,620,068 B2 4/2023 Alkalay et al.
2021/0357136 A1 * 11/2021 Gelli ..................... G06F 3/0632

* cited by examiner

*Primary Examiner* — Kalpit Parikh
(74) *Attorney, Agent, or Firm* — BainwoodHuang

(57) ABSTRACT

Techniques for processing data involve receiving an access request for a logical block used for storing data, the access request including a logical block address for the logical block. Such techniques further involve determining, if it is determined that the logical block address is in a used address space, an index entry corresponding to the logical block address from index entries, the index entry indicating arrangements of logical blocks on a corresponding pool stripe, wherein the pool stripe includes disk blocks from disks in a disk pool, and data blocks form at least one data stripe for a disk array. Such techniques further involve determining a target block corresponding to the logical block based on the index entry. Such techniques further involve processing the access request by using the target block. Accordingly, the processing speed of sequential I/O operations is improved, time is saved, and user experience is improved.

21 Claims, 13 Drawing Sheets

METHOD, ELECTRONIC DEVICE AND COMPUTER PROGRAM PRODUCT FOR PROCESSING DATA

CROSS-REFERENCE TO RELATED APPLICATION

This application claims priority to Chinese Patent Application No. CN202210431612.0, on file at the China National Intellectual Property Administration (CNIPA), having a filing date of Apr. 22, 2022, and having "METHOD, ELECTRONIC DEVICE AND COMPUTER PROGRAM PRODUCT FOR PROCESSING DATA" as a title, the contents and teachings of which are herein incorporated by reference in their entirety.

TECHNICAL FIELD

Embodiments of the present disclosure relate to the field of data storage, and more particularly, to a method, an electronic device, and a computer program product for processing data.

BACKGROUND

With the development of storage technologies, increasingly more users use disk arrays to store data. A disk array is a set of disks formed by a plurality of independent disks combined in different ways. The disk array may be, for example, a Redundant Array of Independent Disks (RAID), or a set of disks with other suitable structures/forms. For users, the disk array is just like one disk, but can provide a higher storage capacity than a single hard disk, and can also provide data backup. Different composition methods of disk arrays are referred to as RAID Levels, such as RAID 0, RAID 1, and RAID 5.

With the development of RAID technologies, many disks constitute a disk pool. Disks in a disk pool are then divided into sectors, and a disk array is constructed from these sectors. Reading and writing disk pool data are now performed at a disk sector level rather than a disk level. For example, the size of each disk sector used for creating a RAID is 4 GB, and for a 4+1 RAID5 disk array, the storage capacity is 16 GB. However, there are still many problems to be solved in a disk array formed by disk sectors.

SUMMARY OF THE INVENTION

A method, an electronic device, and a computer program product for processing data are provided in embodiments of the present disclosure.

According to a first aspect of the present disclosure, a method for processing data is provided. The method includes receiving an access request for a logical block used for storing data, the access request including a logical block address for the logical block. The method further includes determining, if it is determined that the logical block address is in a used address space, a first index entry corresponding to the logical block address from a plurality of index entries, the index entry of the plurality of index entries indicating arrangements of a plurality of logical blocks on a corresponding pool stripe, wherein the pool stripe includes a plurality of disk blocks from a plurality of disks in a disk pool, and data blocks in the plurality of logical blocks form at least one data stripe for a disk array. The method further includes determining a target disk block corresponding to the logical block from the plurality of disk blocks based on the first index entry. The method further includes processing the access request by using the target disk block.

According to a second aspect of the present disclosure, an electronic device is provided. The electronic device includes at least one processor; and a memory coupled to the at least one processor and having instructions stored thereon, wherein the instructions, when executed by the at least one processor, cause the device to perform actions including: receiving an access request for a logical block used for storing data, the access request including a logical block address for the logical block; determining, if it is determined that the logical block address is in a used address space, a first index entry corresponding to the logical block address from a plurality of index entries, the index entry of the plurality of index entries indicating arrangements of a plurality of logical blocks on a corresponding pool stripe, wherein the pool stripe comprises a plurality of disk blocks from a plurality of disks in a disk pool, and data blocks in the plurality of logical blocks form at least one data stripe for a disk array; determining a target disk block corresponding to the logical block from the plurality of disk blocks based on the first index entry; and processing the access request by using the target disk block.

According to a third aspect of the present disclosure, a computer program product is provided, which is tangibly stored on a non-volatile computer-readable medium and includes machine-executable instructions which, when executed, cause a machine to perform steps of the method in the first aspect of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure.

In the accompanying drawings, identical or corresponding numerals represent identical or corresponding parts.

DETAILED DESCRIPTION

Figure 1:
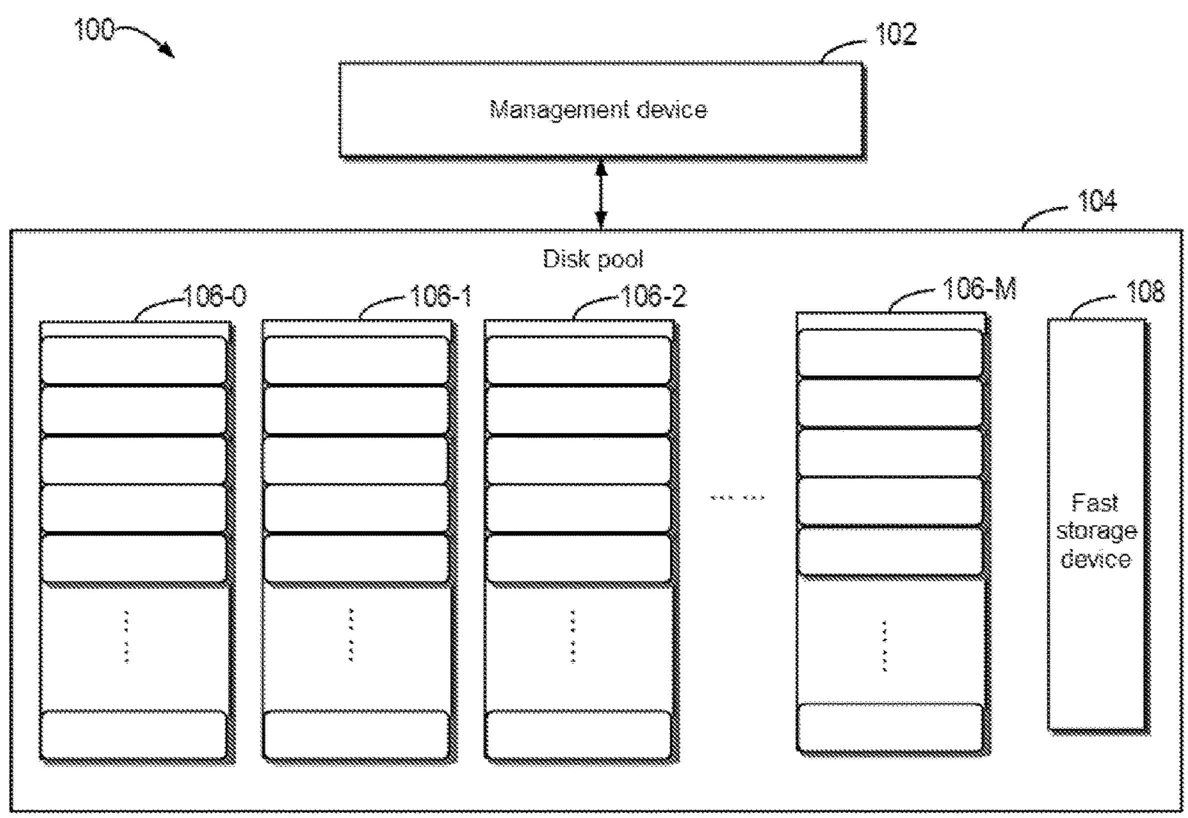
FIG. 1 is a schematic diagram of example environment 100 in which a device and/or a method according to an embodiment of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As described above, in a conventional solution, disk sectors in a disk pool are used for constructing a mapped RAID. The mapped RAID can provide RAID protection. However, this mapped RAID cannot distribute user I/Os evenly to all disks. Because the relationship between each stripe and a logical block address in this storage method is fixed, especially when a used logical address has been used for storing data in the stripe, user sequential IOs can only be allocated to the number of disks that is equal to the number of RAID widths. Since the mapping relationship between logical blocks and RAID stripes has been fixed, even if disks are added to the disk pool at this point, there is no way to use the added disks to process these sequential I/Os in parallel, and consequently the operation time of the sequential I/Os becomes longer.

In order to at least solve the above and other potential problems, an embodiment of the present disclosure provides a method for processing data. In the method, a management device receives an access request for a logical block for storing data, the access request including a logical block address for the logical block. If it is determined that the logical block address is in a used address space, a first index entry corresponding to the logical block address is determined from a plurality of index entries, the index entry of the plurality of index entries indicating arrangements of a plurality of logical blocks on a corresponding pool stripe, wherein the pool stripe includes a plurality of disk blocks from a plurality of disks in a disk pool, and data blocks in the plurality of logical blocks form at least one data stripe for a disk array. Then, the management device determines a target disk block corresponding to the logical block from the plurality of disk blocks based on the first index entry, and processes the access request by using the target disk block. Through this method, the processing speed of sequential I/O operations is improved, time is saved, and user experience is improved.

As used herein, the term "pool stripe" refers to a set of disk blocks formed by physical disk blocks each provided by each disk of a plurality of disks in a disk pool. The set of disk blocks is used for storing data blocks and a parity block that constitute at least one stripe for the disk array.

Example environment 100 in which a device and/or a method according to an embodiment of the present disclosure may be implemented will be described below with reference to FIG. 1. As shown in FIG. 1, example environment 100 includes management device 102 and disk pool 104. Management device 102 manages various operations in disk pool 104.

Disk pool 104 is composed of disks that store a large amount of data. Examples of disks may include, but are not limited to, magnetic disks, optical discs, hard disk drives (HDDs), solid state drives (SSDs), and caches. Alternatively or additionally, disk pool 104 may include storage disks of the same type or storage disks of different types.

Disk pool 104 illustrated in FIG. 1 has a plurality of disks 106-0, 106-1, 106-2, . . . , and 106-M, where M is a positive integer, which are collectively referred to as disk 106 for the convenience of description. Each disk in disk pool 104 is divided into a plurality of disk blocks, where the disk blocks are of the same size. The quantity of disk blocks on each disk may or may not be the same. The size of the disk blocks may be set as required. The disk blocks on disk 106 are used for storing data, which are mapped to logical blocks in a logical space provided to a user.

The disks in disk pool 104 form at least one disk array. Formats of the disk array include, but are not limited to, RAID 2, RAID 3, RAID 4, RAID 5, RAID 7, RAID 10, and the like. In one example, disk pool 104 has 10 disks, which can form two 4+1 RAID5 disk arrays. In another example, the disk pool has 8 disks, which can form a 4+1 RAID 5 disk array and a 2+1 RAID 5 disk array. In addition, disks may be added into the disk pool. For example, the original disk pool has 5 disks, forming a 4+1 RAID5 disk array. If 5 disks are added, a new 4+1 RAID5 disk array will be formed. If 3 disks are added, a 2+1 RAID5 disk array will be formed. If 2 more disks are added at this point, a 4+1 RAID5 disk array may be formed with the previously added 3 disks and the further added 2 disks. The above examples are intended to describe the present disclosure only and are not specific limitations to the present disclosure.

Disk pool 104 also includes fast storage device 108. Fast storage device 108 can be used for fast access to data, which is generally faster than disk 106. Fast storage device 108 may be a non-volatile random access memory (NVRAM), a flash memory, or the like. Fast storage device 108 is mainly used for storing index information for a pool stripe in the disk pool. The index information includes a plurality of index entries, each index entry being used for indicating arrangement information of logical blocks in the pool stripe in the disk pool. Each index entry typically includes a pool stripe number, a block address of a starting logical block stored in the pool stripe, the magnitude of the quantity of logical blocks, and a starting position. The magnitude of the quantity of logical blocks may also be replaced by the magnitude of the amount of data stored. The starting position indicates a position of the starting logical block in the pool stripe.

Management device 102 may receive requests for various operations on the disk array from users or upper-layer applications, for example, receiving an I/O request to process data from a user, or transferring data in the disk when a disk is added to the disk pool or a damaged disk is found, or the like.

In some embodiments, management device 102 needs to store the index information for the pool stripe in fast storage device 108 after writing to the pool stripe. When disks are added, management device 102 directly implements parallel execution of I/O operations on the newly added disks according to the index information and the quantity of disks in the disk pool.

Through this method, the processing speed of sequential I/O operations is improved, time is saved, and user experience is improved.

Figure 2:
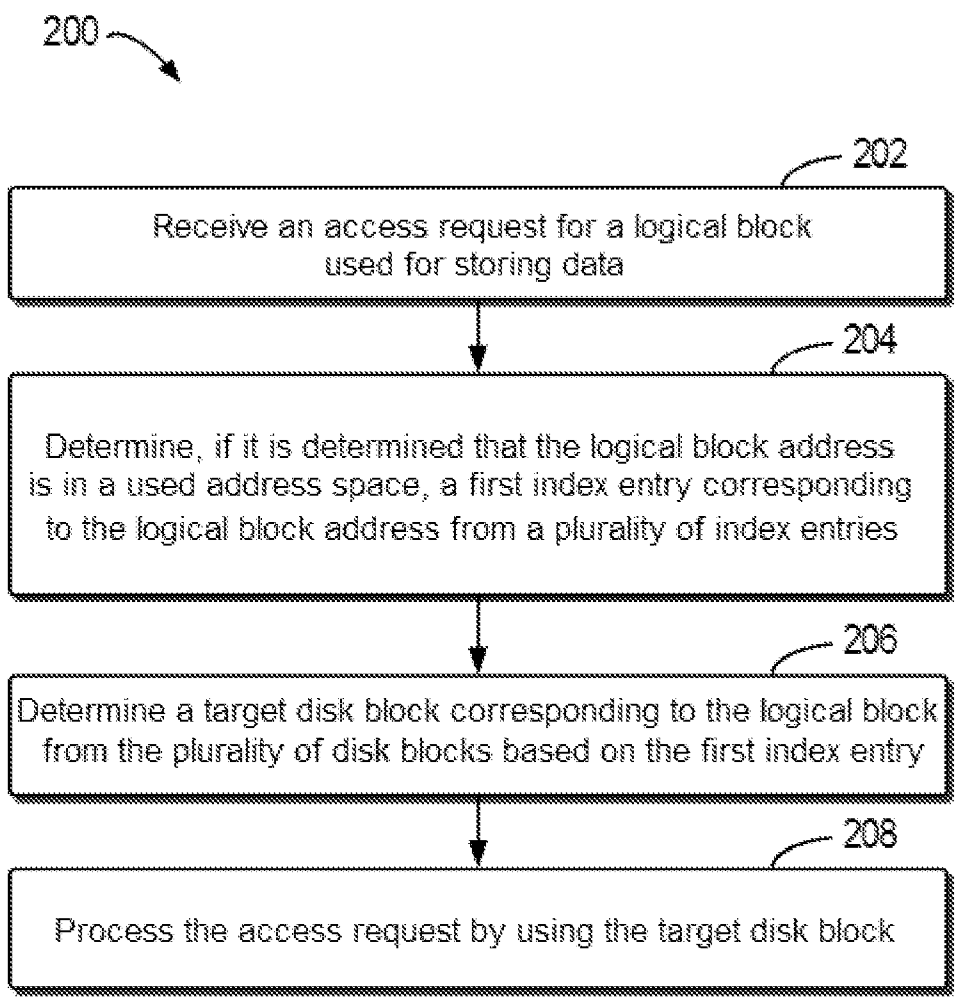
FIG. 2 is a flow chart of method 200 for processing data according to an embodiment of the present disclosure.

A block diagram of example system 100 in which embodiments of the present disclosure can be implemented has been described above with reference to FIG. 1. A flow chart of method 200 for processing data according to an embodiment of the present disclosure will be described below with reference to FIG. 2. Method 200 can be performed at management device 102 in FIG. 1 and any suitable computing device.

At block 202, an access request for a logical block for storing data is received, the access request including a logical block address for the logical block. For example, management device 102 in FIG. 1 may receive an I/O operation request, including a read operation, a write operation, or the like, from an upper-layer application. The access request received by management device 102 includes the logical block address of the logical block to be accessed.

At block 204, if it is determined that the logical block address is in a used address space, a first index entry corresponding to the logical block address is determined from a plurality of index entries. Each index entry of the plurality of index entries indicates an arrangement of a plurality of logical blocks on a corresponding pool stripe. The pool stripe includes a plurality of disk blocks from the plurality of disks in the disk pool, and data blocks in the plurality of logical blocks form at least one data stripe for a disk array.

Figure 3:
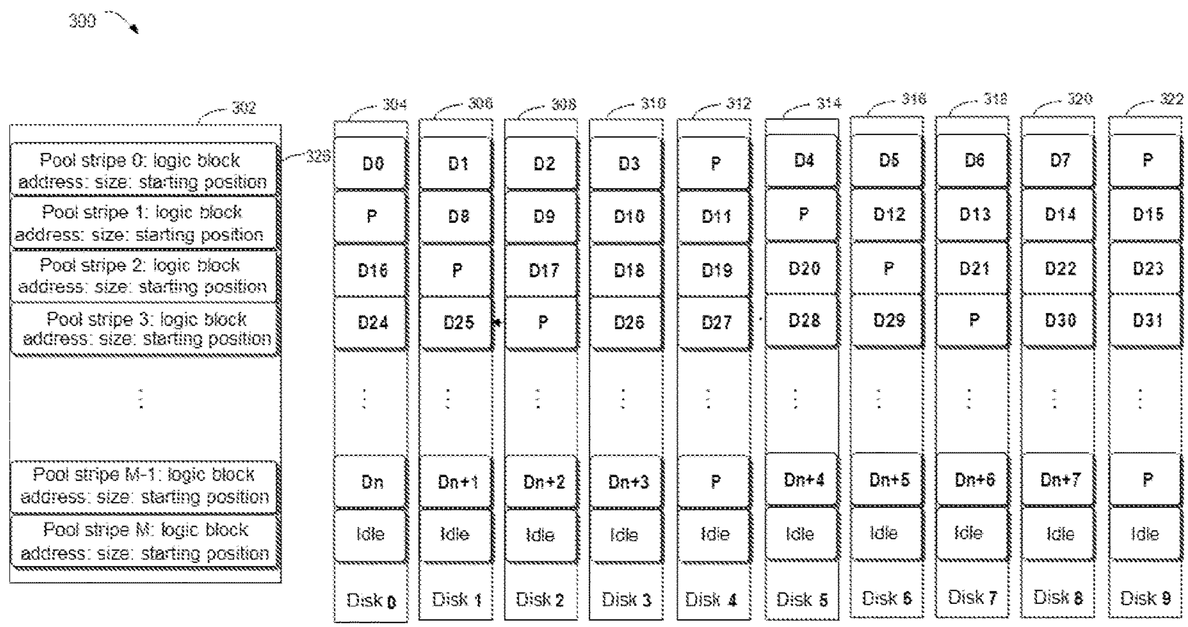
FIG. 3 is a schematic diagram of example 300 used for arranging logic blocks in a disk pool according to an embodiment of the present disclosure.

The pool stripe and corresponding index entries in the disk pool are described below with reference to FIG. 3. As shown in FIG. 3, there are ten disks in the disk pool: disk 304, disk 306, disk 308, disk 310, disk 312, disk 314, disk 316, disk 318, disk 320, and disk 322, also known as disk 0-disk 9. Disk 304, disk 306, disk 308, disk 310, and disk 312 form a 4+1 RAID5 disk array, and disk 314, disk 316, disk 318, disk 320, and disk 322 also form a 4+1 RAID5 disk array.

Each of these disks provides a disk block of the same size to form a pool stripe. The logical blocks presented to the user and used for storing data blocks are mapped to disk blocks in the pool stripe. Data blocks stored on one pool stripe may constitute at least one data stripe. Fast storage device 302 stores index information of the pool stripe. The index information includes a plurality of index entries, and each index entry is used for indicating a pool stripe. Each index entry includes a pool stripe number, a logical block address of a starting logical block, the magnitude of the quantity of logical blocks that can be stored, and a starting position. The logical block address of the starting logical block is a logical block address of a starting logical block stored in sequence in the pool stripe or a minimum logical block address for the pool stripe. The magnitude of the quantity of logical blocks can also be replaced by the magnitude of the amount of data stored. The starting position indicates a position of the starting logical block or the logical block having the smallest logical block address in the pool stripe.

Figure 7:
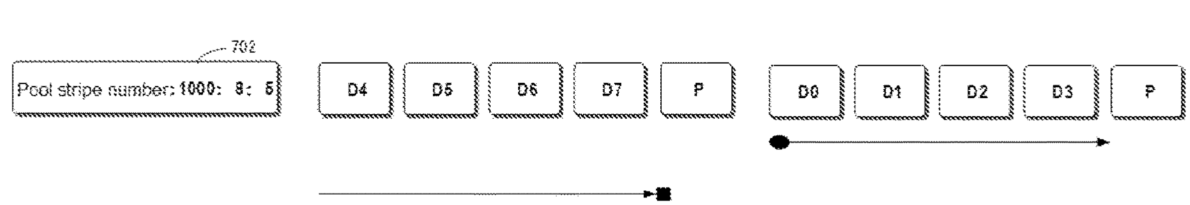
FIG. 7 is a schematic diagram of example 700 of an arrangement of logic blocks on a pool stripe according to an embodiment of the present disclosure.

The index entry will be described in detail below with reference to FIG. 7. As shown in FIG. 7, index entry 702 for a pool stripe is shown, which includes a pool stripe number corresponding to the pool stripe. Logical blocks for sequentially storing data blocks are mapped in the pool stripe, wherein a logical block address for data block D0 is 1000, a logical block address for data block D1 is logical block address 1001, and a logical block address for data block D2 is 1002, and by that analogy, a logical block address for data block D7 is 1007. As can be seen, a storage order of data blocks is storing from left to right. When data block D0 is in the fifth disk block of the pool stripe, storage is performed sequentially from the disk block to the right, and then sequential storage is returned to the start of the pool stripe and continued to be performed. First data block D0 stored in the stripe corresponds to logical block address 1000 of the starting logical block. Therefore, the logical block address in the index entry is 1000. The pool stripe has 8 logical blocks that store 8 data blocks, so the quantity of logical blocks in the pool index entry is 8. Data block D0 is located on disk 5 or the disk block is located on the fifth disk block in the pool stripe, and therefore, a position ID is 5, thus forming an index entry-pool stripe number: 1000: 8: 5.

Returning to FIG. 2 for the following description, in some embodiments, the index entry includes the address of the starting logical block located in the pool stripe and the quantity of the logical blocks. Therefore, management device 102 may search for, based on the index information, an index entry the logical block address corresponds to. First, management device 102 sequentially searches for index entries from a plurality of index entries in the index information. As each index entry is searched for, an address range associated with the index entry is determined based on the address of the starting logical block and the quantity in the index entry. If it is determined that the logical block address is within the address range, the index entry is determined as the first index entry. If the logical block address is not within this range, a next index entry is searched for. In the above manner, the index entry corresponding to the logical address can be quickly determined. The above examples are intended to describe the present disclosure only and are not specific limitations to the present disclosure.

At block 206, based on the first index entry, a target disk block corresponding to the logical block is determined from the plurality of disk blocks. For example, management device 102 is used for determining the target disk block corresponding to the logical block from disk 106.

In some embodiments, the index entry further includes the position of the starting logical block among the plurality of disk blocks in the pool stripe. At this point, management device 102 determines the target disk block corresponding to the logical block in the access request from the plurality of disk blocks according to the starting logical block address and the position. For example, by determining an interval between the logical block number and the starting logical block address, disk blocks corresponding to the interval are searched in a predetermined order from the position where the starting logical block is located. Referring to FIG. 7, if the logical block address of the logical block is 1002, its distance from starting logical block address 1000 of the index entry is 2. Since the logical block of the logical block address 1000 is in the fifth disk block, a second disk block to the right is the disk block corresponding to logical address 1002. The above examples are intended to describe the present disclosure only and are not specific limitations to the present disclosure.

At block 208, the access request is processed by using the target disk block. After management device 102 determines the target disk block, an access processing is performed on the target disk block.

In some embodiments, when the access request is a read request, data on the target disk block is read and returned to the user or the upper-layer application.

In some embodiments, when the access request is a write request, data is written to the target disk block to form a data block. At this point, related data blocks on related disk blocks in the pool stripe are further acquired. A parity data block is then generated based on the data block and the related data blocks on the related disk blocks in the pool stripe. The parity data block is then stored to update the data stripe. Referring to FIG. 3, if data block D2 in pool stripe 0 is restored, data blocks D0, D1, and D3 are also acquired, and parity block P is recalculated. The recalculated parity block P is then stored. If the write request also re-writes D0, D1, and D3, parity block P is rebuilt by using re-stored D0, D1, D2, and D3. The above examples are intended to describe the present disclosure only and are not specific limitations to the present disclosure.

In some embodiments, when the access request is a write request and the logical block address in the access request is in an unused address space, management device 102 determines a disk block available for the logical block from an unused pool stripe. Data will then be written to the disk block to form a data block. Management device 102 also forms a data stripe for the disk array in the new pool stripe based on the data block in combination with other written data blocks. A new index entry for the new pool stripe is then updated based on the arrangement of the logical blocks in the new pool stripe. For example, as shown in FIG. 3, if the write request is to write data in an unused logical space, and the logical space corresponds to pool stripe M, the data is written in a disk block of pool stripe M, which then forms a stripe in combination with data blocks of other disk blocks associated with the disk block.

In some embodiments, a plurality of disks may be added to the disk pool to form a disk pool with a larger storage space. The first set of disks in the original disk pool and the newly added second set of a plurality of disks together constitute a new disk pool. If a write request is received after the second set of disks is added to the disk pool, wherein the write request includes a plurality of ordered logical block addresses of a plurality of logical blocks used for storing data, it is necessary to determine whether the plurality of ordered logical block addresses are in the used address space. If the plurality of ordered logical block addresses are not in the used address space, it indicates that these logical block addresses are newly allocated logical spaces. At this point, during data writing, after a disk block corresponding to the first ordered logical block address is determined, data may be sequentially written from the disk block to the pool stripe formed by the disk blocks from the first set of disks and the second set of disks.

Figure 4:
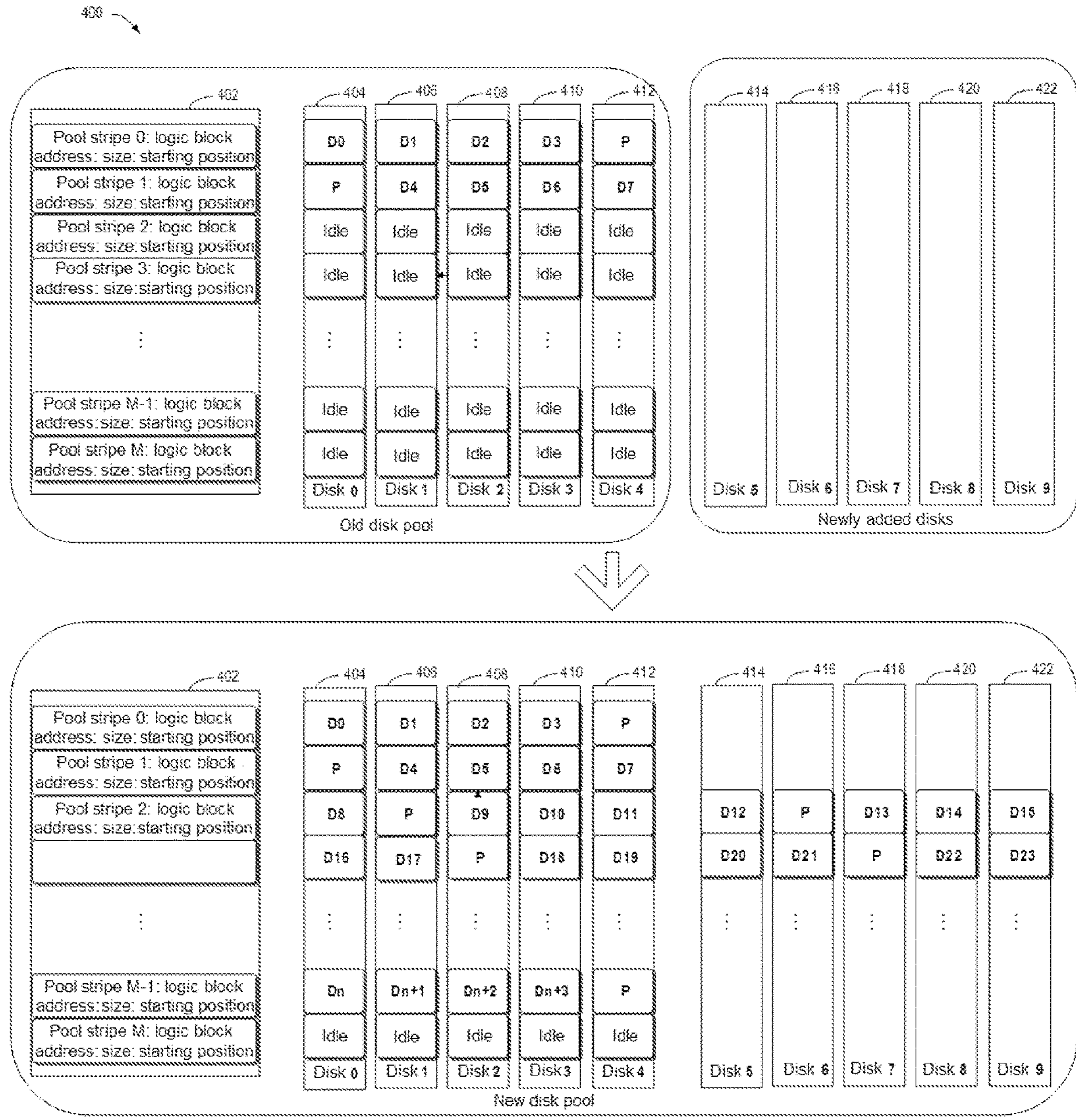
FIG. 4 is a schematic diagram of example 400 of an arrangement change of logic blocks after a disk is added according to an embodiment of the present disclosure.

As shown in FIG. 4, the old disk pool has fast storage device 402 that stores pool stripe index information and disks 404, 406, 408, 410, and 412. Disks 404, 406, 408, 410, and 412 are used for forming a RAID4+1 disk array. Thus, five disk blocks from five disks in the pool stripe form a RAID stripe. New disks 414, 416, 418, 420, and 422 are later added to form a new disk pool. The added 5 disks also form a 4+1 RAID 5 disk array. Therefore, the pool stripe in the new disk pool can form two RAID stripes. If a first logical block address among a plurality of logical block addresses required by the new write request corresponds to pool stripe 2, data is written in the pool stripe to form data block D8, and a plurality of data blocks are written in sequence. At this point, the size of the pool stripe has changed from 5 disk blocks to 10 disk blocks. Therefore, data can be written to the pool stripe and the following pool stripes in sequence. The index entry for each pool stripe is updated after the pool stripe has been written.

In some embodiments, when the write operation is to rewrite original logical blocks, that is, the plurality of ordered logical block addresses in the write request are in the used address space, management device 102 determines, from the plurality of index entries, a second index entry corresponding to the first ordered logical block address in the plurality of ordered logical block addresses. At this point, management device 102 also determines a total quantity of disk blocks in the target pool stripe corresponding to the second index entry according to the first set of disks and the second set of disks. Next, based on the second index entry and the total quantity, a reference quantity of disk blocks available in the plurality of logical blocks in the target pool stripe is determined. Data is then stored sequentially in the reference quantity of disk blocks in the target pool stripe. Finally, the second index entry and an index entry of a next pool stripe of the target pool stripe are updated. The above process will be described in detail below with reference to FIG. 5.

Figure 5:
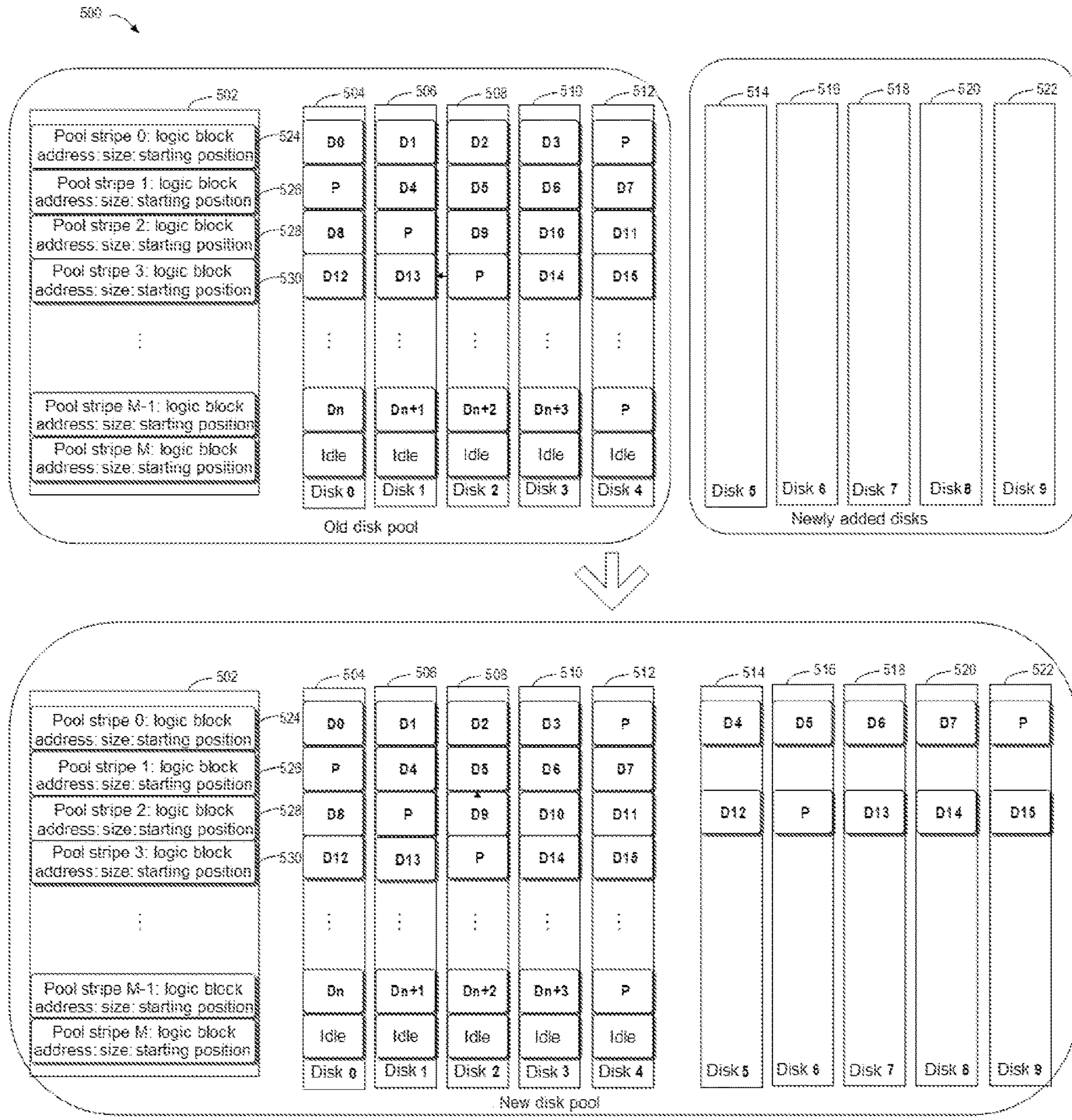
FIG. 5 is a schematic diagram of example 500 of an arrangement change of logic blocks after a disk is added according to an embodiment of the present disclosure.

FIG. 5 is a schematic diagram of example 500 of an arrangement change of logic blocks after a disk is added according to an embodiment of the present disclosure. As shown in FIG. 5, the old disk pool has fast storage device 502 that stores pool stripe index information and disks 504, 506, 508, 510, and 512. Disks 504, 506, 508, 510, and 512 are used for forming a 4+1 RAID 5 disk array. Thus, five disk blocks from five disks in the pool stripe form a RAID stripe. New disks 514, 516, 518, 520, and 522 are later added to form a new disk pool. The added 5 disks form a 4+1

RAID5 disk array. Therefore, the pool stripe in the new disk pool can form two RAID stripes. If the write request is to rewrite the previously written data D0-D15, at this point, after receiving a plurality of logical block addresses for D0-D15, management device 102 searches for an index entry that corresponds to the logical block address corresponding to D0. Then, it is determined that D0 is located on disk 504. The management device further determines that the total quantity of disks becomes 10 at this point, and then determines the quantity of logical blocks that can be applied in the pool stripe. The data is then written sequentially into the reference quantity of disk blocks on pool stripe 0. As can be seen, after the sequential writing of D0, D1, D2, and D3, data D4-D7 is also written sequentially. The index entry of pool stripe 0 is updated after the data has been written. Next, the index entry of pool stripe 1 is updated, because the data of the corresponding logical block in the original pool stripe 1 has been written to pool stripe 0 after the disks are newly added. Therefore, the index entry of pool stripe 1 is invalidated so that it can be used for storing data as a new idle stripe after subsequent processing. Then, the pool stripe where data D8 is located is found to continue to write data D8-D15, the index entry of stripe 2 is updated, and the index entry of stripe 3 is invalidated. Rewriting data in this way can directly use the newly added disk to write data, which improves the parallelism of data writing and speeds up the sequential I/O processing.

In some embodiments, if the quantity of newly added disks are not 5, but 3, a RAID 2+1 disk array is formed. At this point, the data in original pool stripe 2 is not all written into pool stripe 0, for example, only data blocks D4 and D5 in the stripe 1 are written. After pool stripe 0 is written, the index entry of stripe 1 needs to be updated after the index entry of stripe 0 is updated. The logical block address in the index entry for pool stripe 1 is updated to the logical block address corresponding to D6, the magnitude is adjusted from 4 to 2, and the start address is adjusted from 0 to 3, corresponding to position 3 of the corresponding physical block in the pool stripe. The above examples are intended to describe the present disclosure only and are not specific limitations to the present disclosure.

Through the above method, the processing speed of sequential I/O operations is improved, time is saved, and user experience is improved.

The process of processing data has been described above with reference to FIG. 2 to FIG. 5 and FIG. 7, and a schematic diagram of example 600 of an arrangement of logical blocks according to an embodiment of the present disclosure will be illustrated below with reference to FIG. 6.

Figure 6:
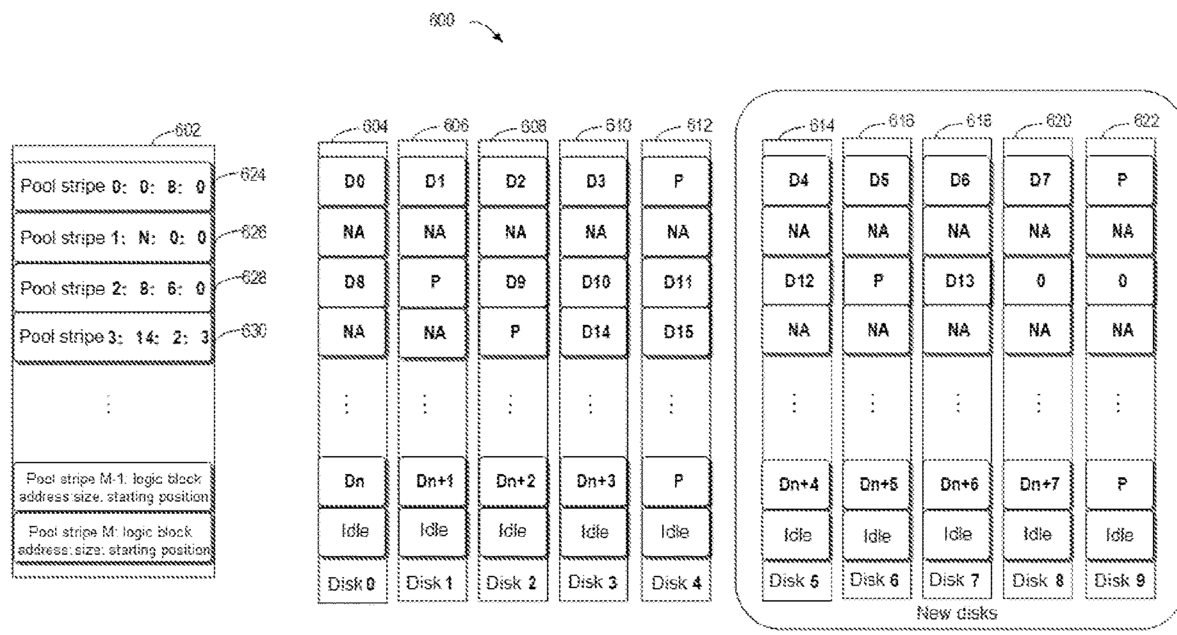
FIG. 6 is a schematic diagram of example 600 of an arrangement of logic blocks according to an embodiment of the present disclosure.

In FIG. 6, 8 data blocks D0-D7 are stored in a pool stripe, an address of a starting logical block thereof is 0, and the starting logical block is located in the 0th disk block. Therefore, the index entry for the pool stripe is: pool stripe 0: 0: 8: 0. Since no data is stored in the second pool stripe, its pool stripe index entry is set to pool stripe 1: N: 0: 0, where N is the maximum value or any suitable value for future use. Pool stripe 2 stores 6 data blocks D8-D13, a logical address of the starting logical block is 8, and the starting position is 0. Therefore, the index entry of pool stripe 2 is pool stripe 2: 8: 6: 0. Two data blocks D14 and D15 are stored in pool stripe 3, a logical address of the starting logical block is 14, and the starting position is 3. Therefore, the index entry is pool stripe 3: 14: 2: 3.

Figure 8:
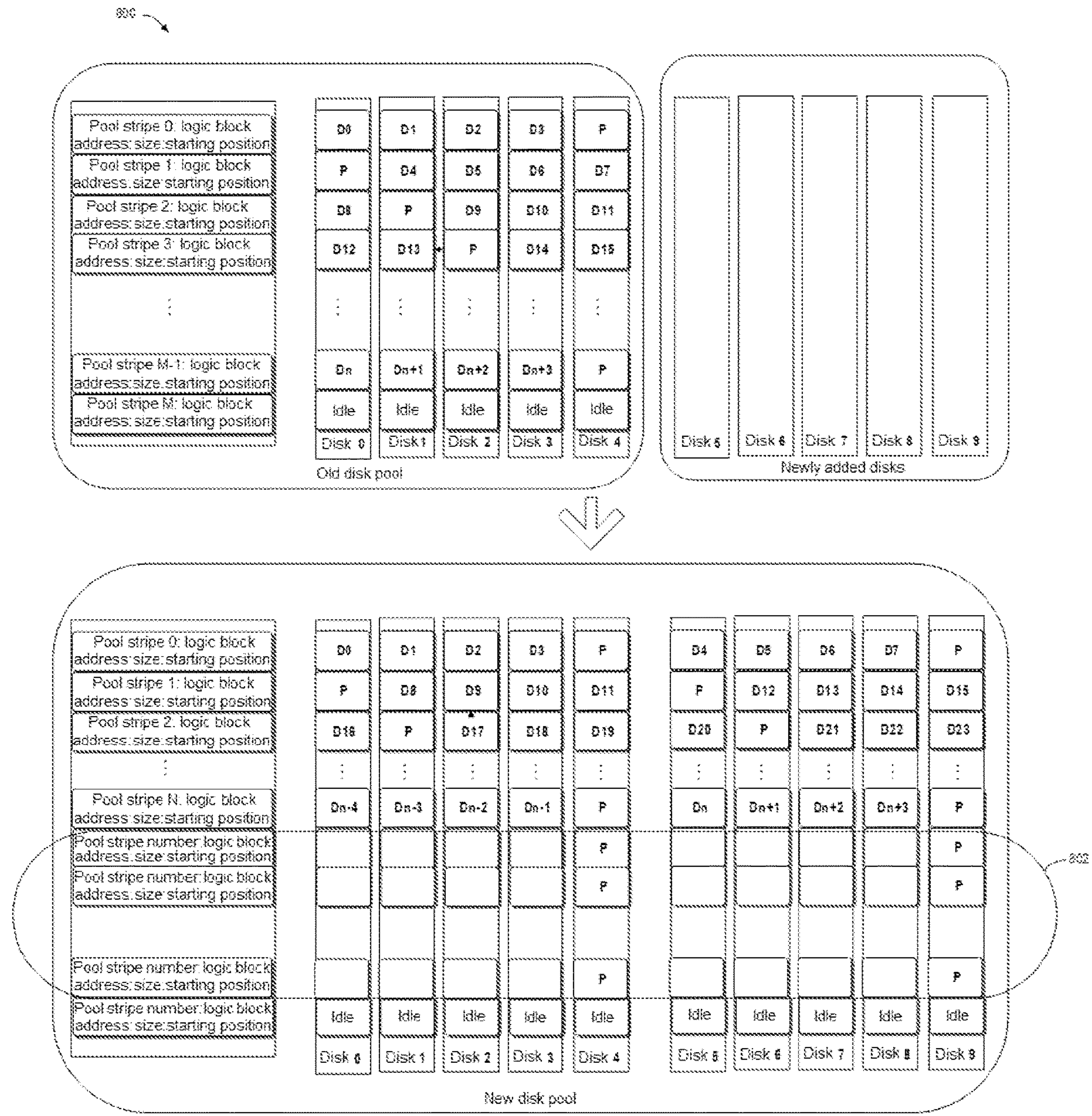
FIG. 8 is a schematic diagram of example 800 of data moving in a disk pool according to an embodiment of the present disclosure.

In some embodiments, after adding the second set of disks to the disk pool, in order to improve the parallelism of accessing the disks, it is necessary to evenly distribute the data across all the disks. Therefore, if there is no access operation, the data in the disk pool is transferred to uniformly store the data in the first set of disks and the second set of disks in the disk pool. As shown in FIG. 8, a schematic diagram of example 800 of data movement in a disk pool according to an embodiment of the present disclosure is shown. Data blocks D0-Dn+3 exist in the old disk pool. After a new disk is added, the data is distributed across all disks by moving the data, and new idle space 802 of the pool stripe is formed on all disks for parallel processing of access operations.

Figure 9:
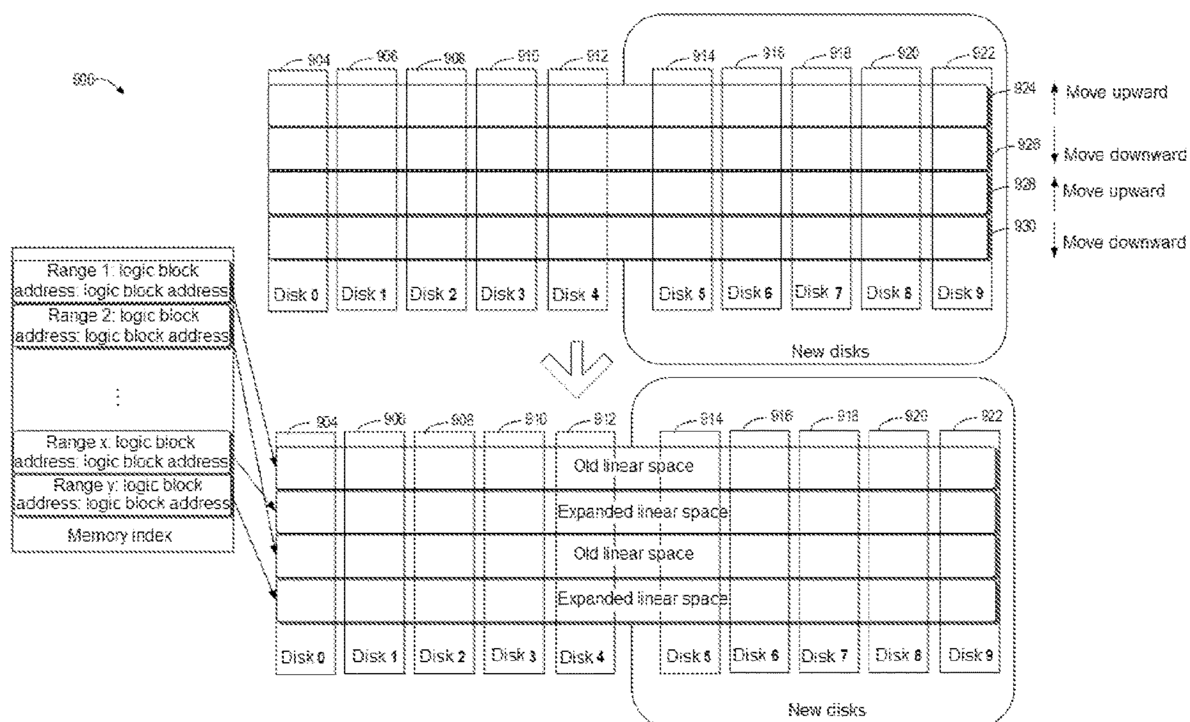
FIG. 9 is a schematic diagram of example 900 of data moving in a disk pool according to an embodiment of the present disclosure.

In some embodiments, in the process of moving data, the data stored in the pool stripe in the disk pool may be moved upward or downward to transfer the data in the disk pool. As shown in FIG. 9, a schematic diagram of example 900 of data movement in a disk pool according to an embodiment of the present disclosure is shown. In FIG. 9, after a new disk is added, part of the data stored in the original disk in AND areas 924, 926, 928, and 930 is moved upward or downward to the newly added disk, forming the old linear space and extended linear space in FIG. 9. The old linear space is used for storing data on the disk, and the extended linear space is mapped into a memory index as a newly added space for presentation to upper-layer applications. In this way, the amount of moved data can be reduced, and the jitter of a magnetic head can be reduced, thereby improving the data transfer efficiency.

Figure 10:
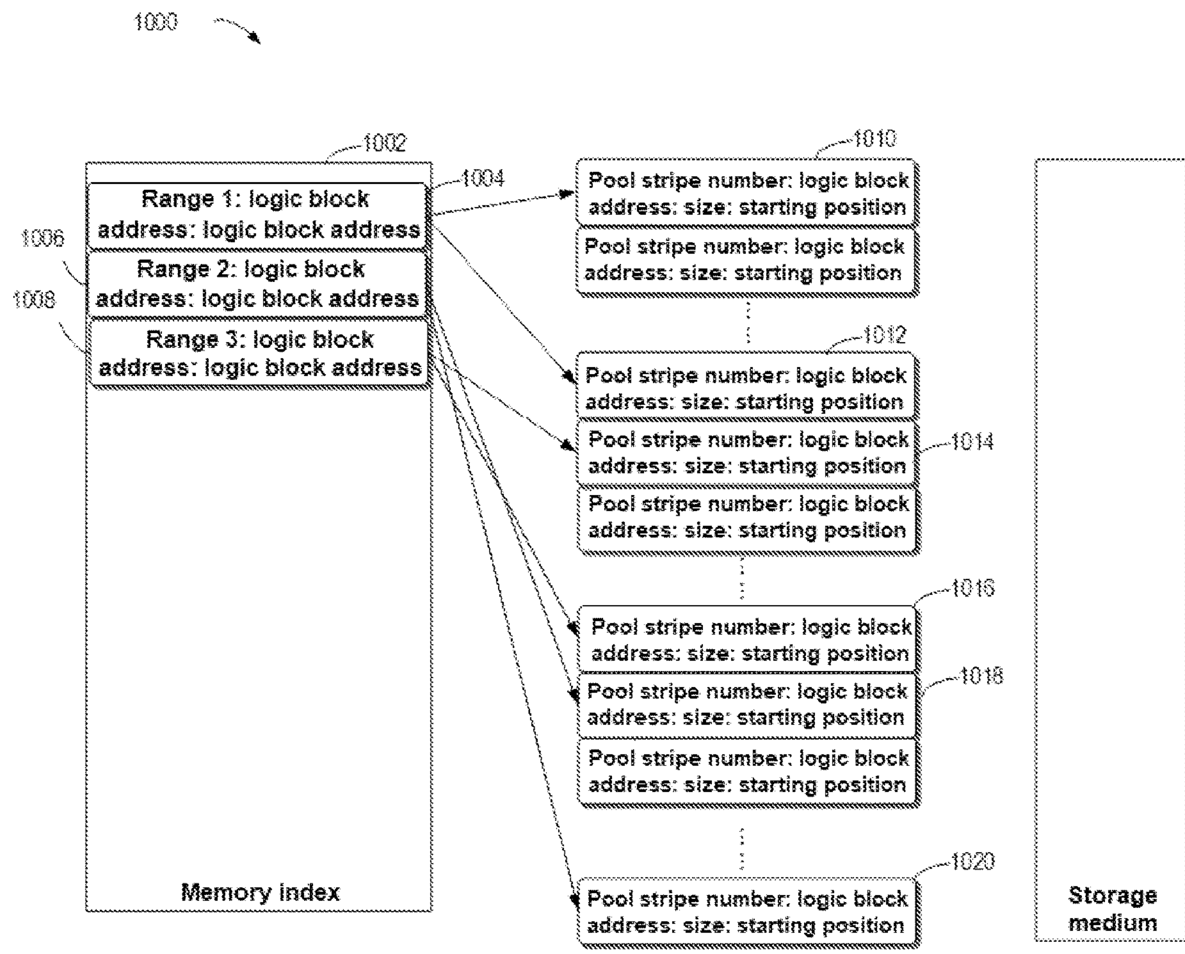
FIG. 10 is a schematic diagram of example 1000 of an address mapping relationship according to an embodiment of the present disclosure.

FIG. 10 further illustrates an address mapping relationship according to an embodiment of the present disclosure. In example 1000 of the mapping relationship, memory index 1002 is used for reflecting spaces corresponding to which pool stripes are used and spaces corresponding to which pool stripes are unused. For example, first indexer index 1004 maps to all index entries between index entry 1010 to index entry 1012, which may indicate used consecutive logical spaces. Second memory index 1006 maps to all index entries between index entry 1018 to index entry 1020, which may indicate used consecutive logical spaces. Third memory index 1008 maps to all index entries between index entry 1014 to index entry 1016, which indicates logical spaces that become idle and unused. When presented to the upper space through the memory index, the used logical space is allocated behind the used logical space, while on an actual disk, the unused logical space may be arranged between data areas where data is stored in the disk as shown in FIG. 10.

In some embodiments, in order to ensure that the stored index entries do not affect the operation of the disk pool when storage device 1102 is damaged, the index entries corresponding to the pool stripe may be stored in the disk blocks of the pool stripe.

Figure 11:
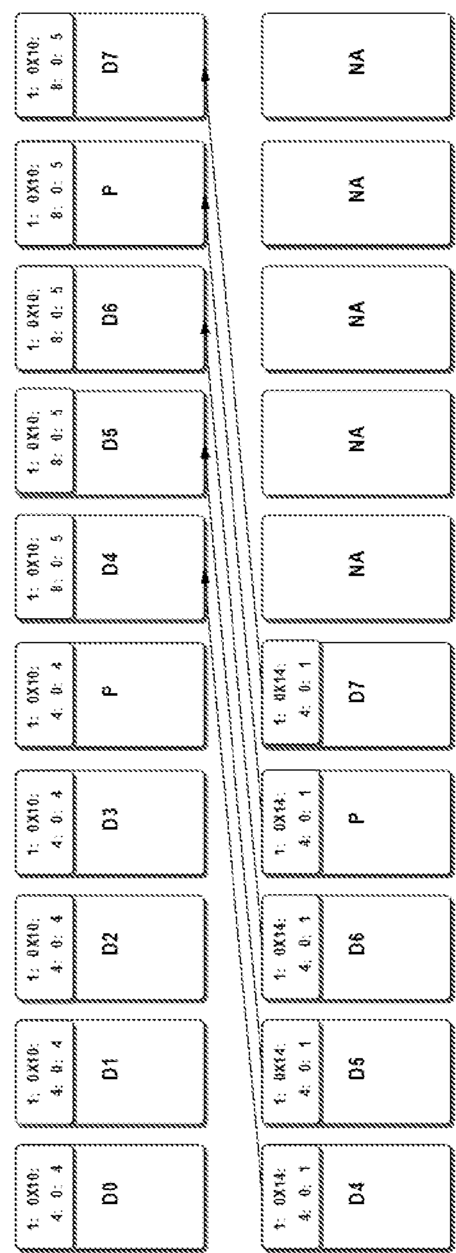
FIG. 11 is a schematic diagram of example 1100 of a backup index entry according to an embodiment of the present disclosure.
Figure 11:
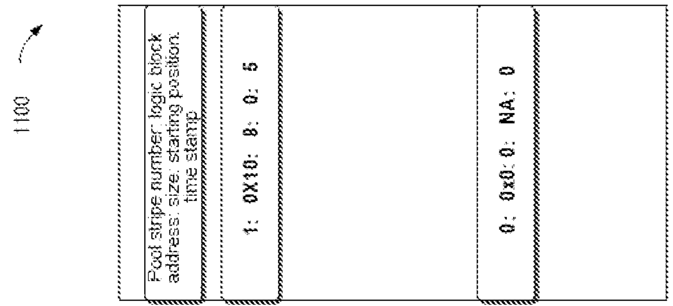

As shown in FIG. 11, example 1100 of a backup index entry according to an embodiment of the present disclosure is shown. The index entry of pool stripe 0 has a backup in each disk block of pool stripe 0 where data is stored. For example, when only data blocks D0-D3 are stored in pool stripe 1, the index entry of pool stripe 0 is stored in parity block P in D0-D3. Alternatively or additionally, the index entry has a time stamp therein to indicate a backup time of the index entry. For example, if a time stamp when D0-D3 and parity block P are stored at the beginning is 4, the index entry is 1: 0X10: 4: 0: 4. Since only data blocks D4-D7 are moved from pool stripe 1 to pool stripe 0, new index entries are stored in D4-D7 and P after the index entries are adjusted, and then the time stamp is marked as 5. In this way, when searching for the backed up index entry, only the index entry with the latest time stamp needs to be searched for. After data blocks D4-D7 have been moved from pool stripe 1 to pool stripe 0, an index entry for stripe 1 is set to form a pool stripe with no logical blocks allocated.

Figure 12:
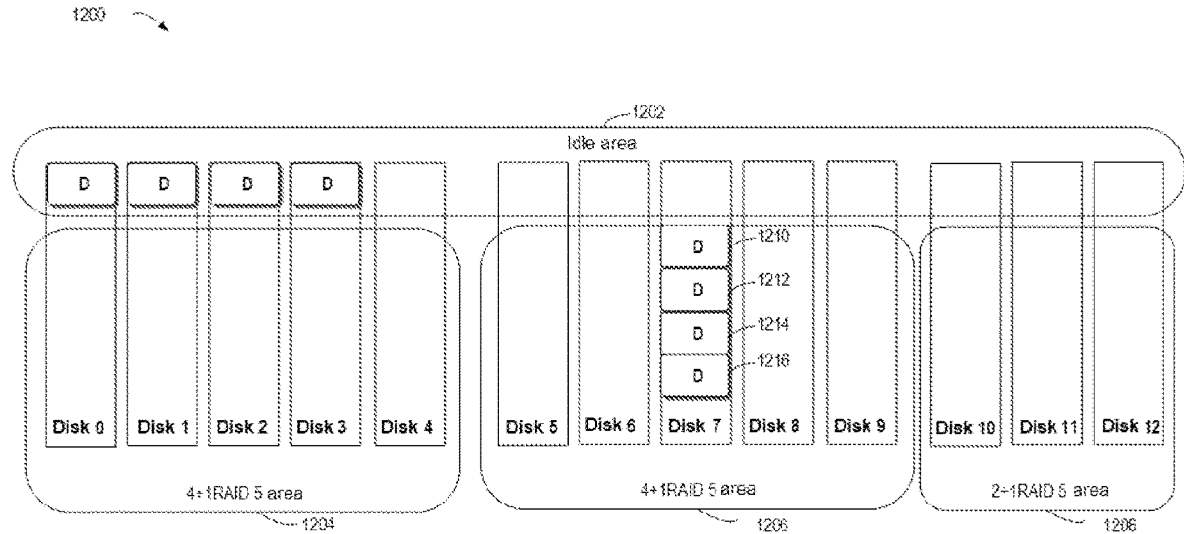
FIG. 12 is a schematic diagram of example 1200 of a disk pool structure according to an embodiment of the present disclosure.

In some embodiments, the plurality of disks in the disk pool each reserve a predetermined amount of idle space. As shown in FIG. 12, a schematic diagram of example 1200 of a disk pool structure according to an embodiment of the present disclosure is shown. Each disk in the disk pool reserves an idle space of a predetermined size to form idle area 1202, wherein usable parts of disk 0 to disk 4 are formed into 4+1 RAID 5 area 1204, and usable parts of disk 5 to disk 9 are formed into 4+1 RAID 5 area 1206. Disk 10 to disk 12 form 2+1 RAID 5 area 1208. If a disk in the disk pool fails, data blocks stored in the failed disk are restored to the idle space of the disk in use in the disk pool. If disk 7 as shown in FIG. 12 fails, its data blocks 1210, 1212, 1214, and 1216 are stored in disk 0 to disk 3. The data stored in the idle area is re-transferred to these disks after replacement with a new disk or recovery of disk 7.

Figure 13:
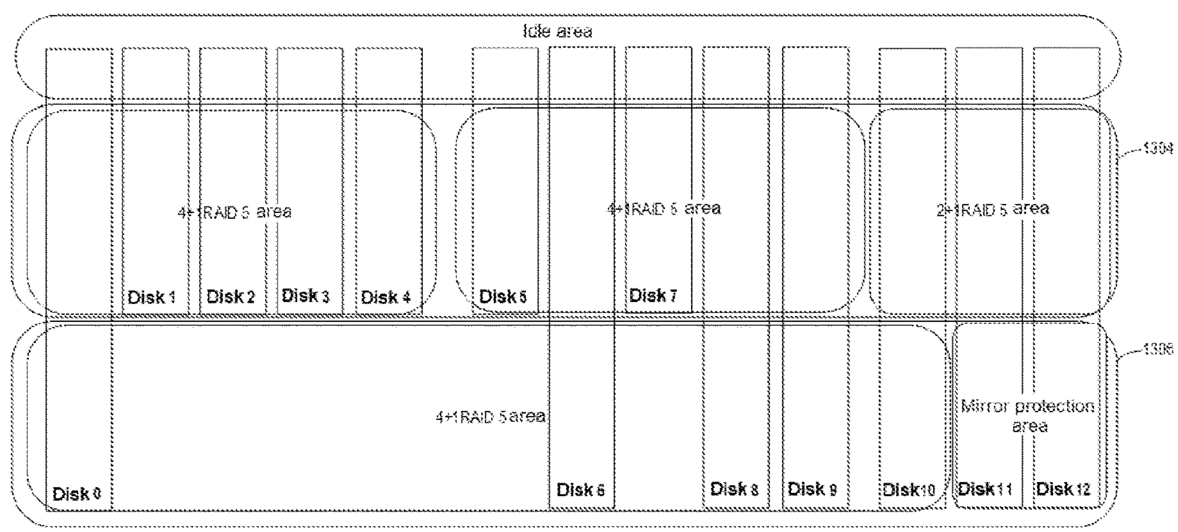
FIG. 13 is a schematic diagram of example 1300 of a disk pool structure according to an embodiment of the present disclosure.

In some embodiments, the sizes of disks in the disk pool are not necessarily the same. For all the disks, the minimum disk capacity thereof may be classified into a first area, such as area 1304 in FIG. 13, to construct a disk array and a pool stripe. For disks with larger disk capacities, excess capacity is used for further constructing appropriate disk arrays and pool stripes, as shown in area 1306 in FIG. 13.

Figure 14:
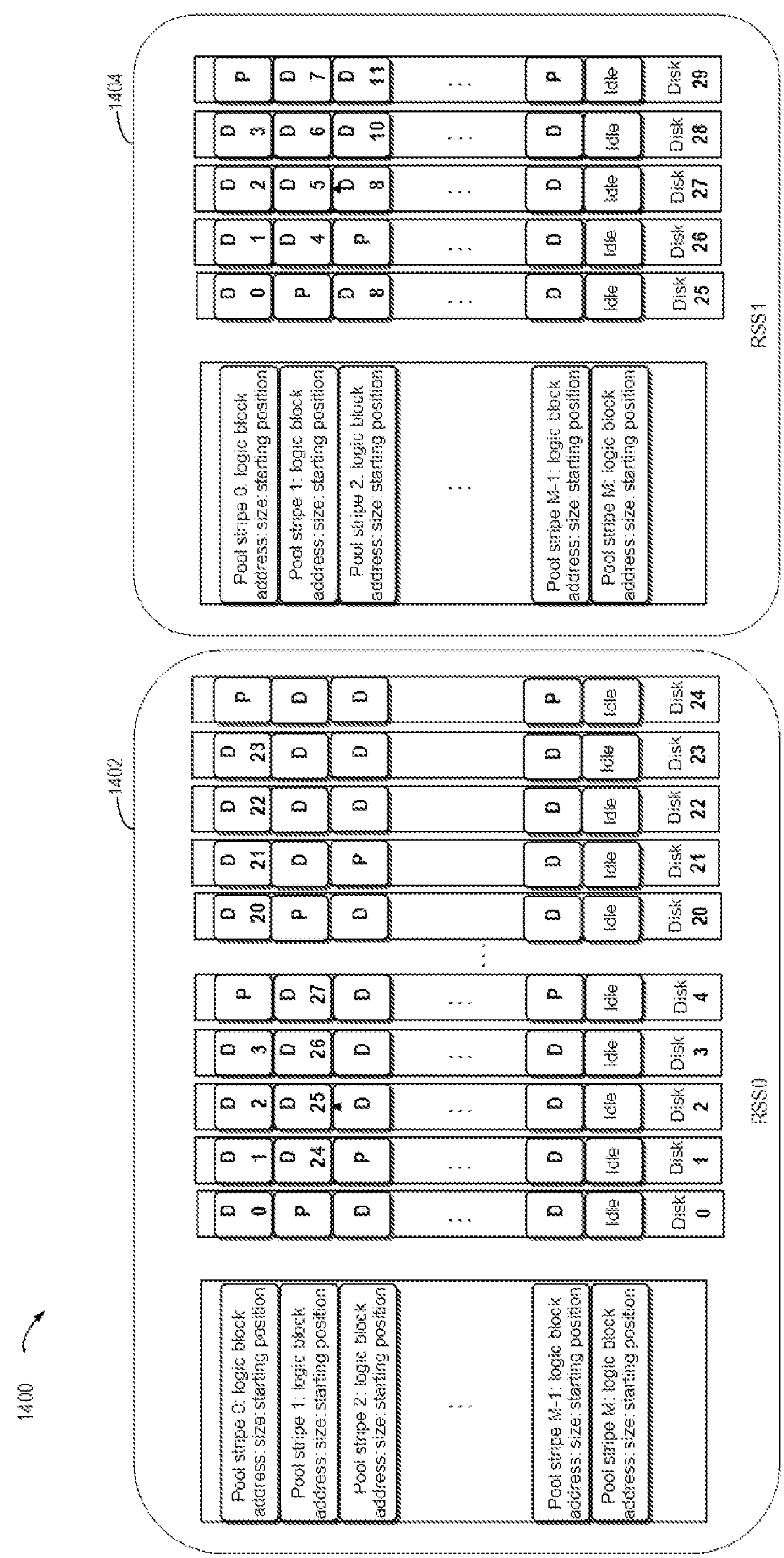
FIG. 14 is a schematic diagram of example 1400 of a disk pool structure according to an embodiment of the present disclosure.

In some embodiments, disks of the same type are classified into a plurality of RAID elastic sets according to required data. For example, for an SSD, 25 disks can be selected as the maximum quantity of disks in the RAID elastic set. For an HDD, 65 disks can be selected as the maximum quantity of disks in the largest RAID elastic set. A pool stripe is set on each RAID elastic set. Different pool stripes are set in different RAID elastic sets. As shown in FIG. 14, there are two RAID elastic sets, RSS0 (1402) and RSS1 (1404). The above examples are intended to describe the present disclosure only and are not specific limitations to the present disclosure.

Figure 15:
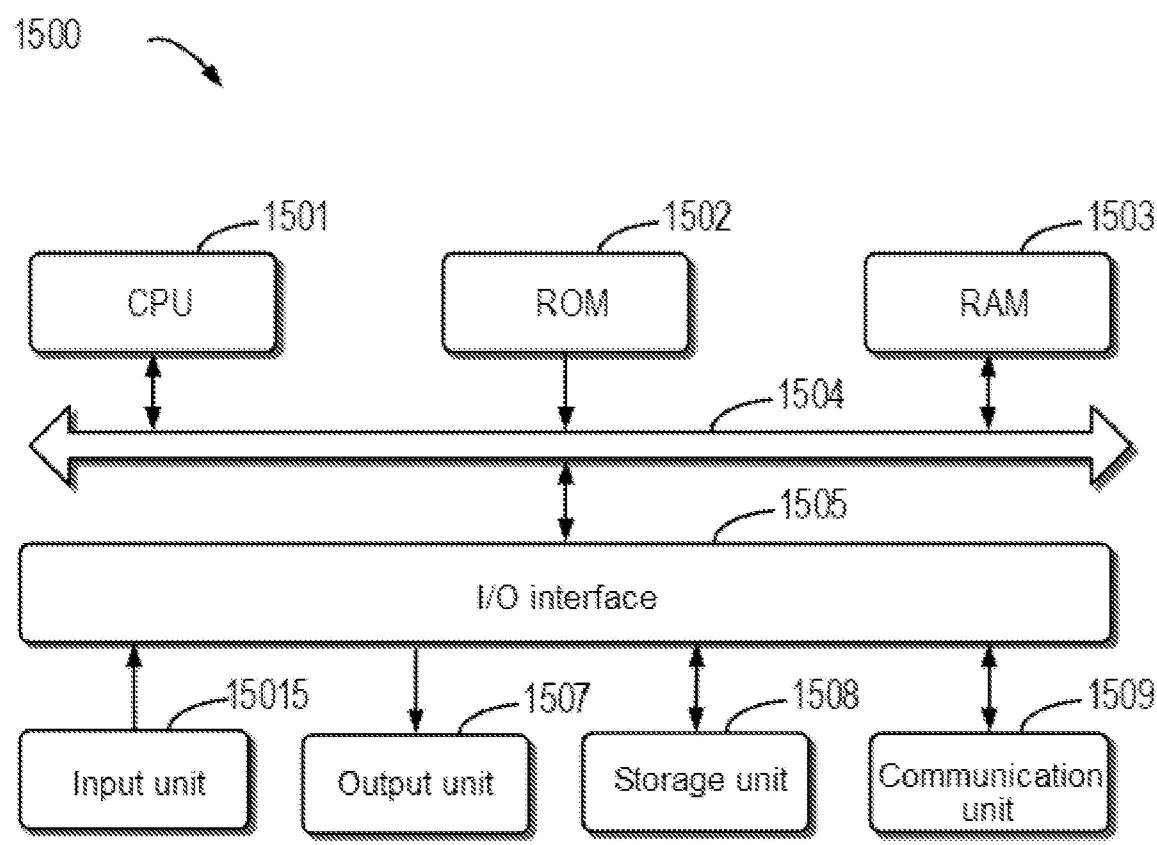
FIG. 15 is a schematic block diagram of example device 1500 suitable for implementing embodiments of the content of the present disclosure.

FIG. 15 shows a schematic block diagram of example device 1500 that may be used to implement embodiments of the present disclosure. Disk management device 102 in FIG. 1 may be implemented using device 1500. As shown in the drawing, device 1500 includes central processing unit (CPU) 1501 that may perform various appropriate actions and processing according to computer program instructions stored in read-only memory (ROM) 1502 or computer program instructions loaded from storage unit 1508 into random access memory (RAM) 1503. Various programs and data required for the operation of device 1500 may also be stored in RAM 1503. CPU 1501, ROM 1502, and RAM 1503 are connected to each other through bus 1504. Input/output (I/O) interface 1505 is also connected to bus 1504.

Multiple components in device 1500 are connected to I/O interface 1505, including: input unit 1506, such as a keyboard and a mouse; output unit 1507, such as various types of displays and speakers; storage page 1508, such as a magnetic disk and an optical disc; and communication unit 1509, such as a network card, a modem, and a wireless communication transceiver. Communication unit 1509 allows device 1500 to exchange information/data with other devices via a computer network, such as the Internet, and/or various telecommunication networks.

The various processes and processing described above, such as method 200, may be performed by processing unit 1501. For example, in some embodiments, method 200 may be implemented as a computer software program that is tangibly included in a machine-readable medium, such as storage unit 1508. In some embodiments, part or all of the computer program may be loaded and/or installed onto device 1500 via ROM 1502 and/or communication unit 1509. When the computer program is loaded into RAM 1503 and executed by CPU 1501, one or more actions of method 200 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the "C" language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A method for processing data, comprising:

receiving an access request for a logical block used for storing data, the access request comprising a logical block address for the logical block;

determining, if determining that the logical block address is in a used address space, a first index entry corresponding to the logical block address from a plurality of index entries, the index entry of the plurality of index entries indicating arrangements of a plurality of logical blocks on a corresponding pool stripe, wherein the pool stripe comprises a plurality of disk blocks from a plurality of disks in a disk pool, and data blocks in the plurality of logical blocks form at least one data stripe for a disk array;

determining a target disk block corresponding to the logical block from the plurality of disk blocks based on the first index entry; and processing the access request by using the target disk block;

wherein the index entry comprises an address of a starting logical block located in the pool stripe and a quantity of logical blocks; and wherein determining the first index entry comprises:

determining an address range associated with the index entry based on the address of the starting logical block and the quantity; and determining the index entry as the first index entry if determining that the logical block address is within the address range.

2. The method according to claim 1, wherein the index entry further comprises a position of the starting logical block in the plurality of disk blocks in the pool stripe; and wherein determining the target disk block comprises:

determining a target disk block corresponding to the logical block from the plurality of disk blocks based on the address of the starting logical block and the position.

3. The method according to claim 1, wherein the access request is a write request, wherein processing the access request by using the target disk block comprises:

writing the data to the target disk block to form a data block;

generating a parity data block based on the data block and a related data block on a related disk block in the pool stripe; and storing the parity data block to update the data stripe.

4. The method according to claim 3, further comprising:

determining a new pool stripe available for the logical block based on the plurality of disks if determining that the logical block address is in an unused address space;

determining a disk block available for the logical block from the new pool stripe;

writing data to the disk block to form a data block;

forming a data stripe for a disk array in the new pool stripe based on the data block; and updating a new index entry for the new pool stripe based on the arrangement of the logical block in the new pool stripe.

5. The method according to claim 1, wherein the plurality of disks are a first set of disks, and the method further comprises:

responding to receiving a write request after a second set of disks is added to the disk pool, the write request comprising a plurality of ordered logical block addresses for a plurality of logical blocks used for storing data;

determining, if determining that the plurality of ordered logical block addresses are in the used address space, a second index entry corresponding to a first ordered logical block address of the plurality of ordered logical block addresses from the plurality of index entries;

determining, based on the first set of disks and the second set of disks, a total quantity of disk blocks in a target pool stripe corresponding to the second index entry;

determining, based on the second index entry and the total quantity, a reference quantity of logical blocks in the target pool stripe available for use in the plurality of logical blocks;

storing data in the reference quantity of disk blocks in the target pool stripe in sequence; and updating the second index entry and an index entry of a next pool stripe of the target pool stripe based on the storage.

6. The method according to claim 5, further comprising:

transferring, after the second set of disks is added to the disk pool, data in the disk pool to evenly store the data in the first set of disks and the second set of disks in the disk pool if determining that there is no access operation.

7. The method according to claim 6, wherein transferring data in the disk pool comprises:

moving data stored in a pool stripe in the disk pool upward or downward to transfer the data in the disk pool.

8. The method according to claim 1, further comprising:

storing index entries corresponding to the pool stripe in disk blocks of the pool stripe.

9. The method according to claim 1, wherein the plurality of disks in the disk pool each reserve a predetermined size of idle space; and the method further comprises:

restoring, in response to a disk failure in the disk pool, data blocks stored in the failed disk to the idle space in a disk in use in the disk pool.

10. An electronic device, comprising:

at least one processor; and a memory coupled to the at least one processor and having instructions stored therein, wherein the instructions, when executed by the at least one processor, cause the device to perform actions comprising:

receiving an access request for a logical block used for storing data, the access request comprising a logical block address for the logical block;

determining, if determining that the logical block address is in a used address space, a first index entry corresponding to the logical block address from a plurality of index entries, the index entry of the plurality of index entries indicating arrangements of a plurality of logical blocks on a corresponding pool stripe, wherein the pool stripe comprises a plurality of disk blocks from a plurality of disks in a disk pool, and data blocks in the plurality of logical blocks form at least one data stripe for a disk array;

determining a target disk block corresponding to the logical block from the plurality of disk blocks based on the first index entry; and processing the access request by using the target disk block;

wherein the index entry comprises an address of a starting logical block located in the pool stripe and a quantity of logical blocks; and wherein determining the first index entry comprises:

determining an address range associated with the index entry based on the address of the starting logical block and the quantity; and determining the index entry as the first index entry if determining that the logical block address is within the address range.

11. The electronic device according to claim 10, wherein the index entry further comprises a position of the starting logical block in the plurality of disk blocks in the pool stripe; and wherein determining the target disk block comprises:

determining a target disk block corresponding to the logical block from the plurality of disk blocks based on the address of the starting logical block and the position.

12. The electronic device according to claim 10, wherein the access request is a write request, wherein processing the access request by using the target disk block comprises:

writing the data to the target disk block to form a data block;

generating a parity data block based on the data block and a related data block on a related disk block in the pool stripe; and storing the parity data block to update the data stripe.

13. The electronic device according to claim 12, wherein the actions further comprise:

determining a new pool stripe available for the logical block based on the plurality of disks if determining that the logical block address is in an unused address space;

determining a disk block available for the logical block from the new pool stripe;

writing data to the disk block to form a data block;

forming a data stripe for a disk array in the new pool stripe based on the data block; and updating a new index entry for the new pool stripe based on the arrangement of the logical block in the new pool stripe.

14. The electronic device according to claim 10, wherein the plurality of disks are a first set of disks, and the actions further comprise:

responding to receiving a write request after a second set of disks is added to the disk pool, the write request comprising a plurality of ordered logical block addresses for a plurality of logical blocks used for storing data;

determining, if determining that the plurality of ordered logical block addresses are in the used address space, a second index entry corresponding to a first ordered logical block address of the plurality of ordered logical block addresses from the plurality of index entries;

determining, based on the first set of disks and the second set of disks, a total quantity of disk blocks in a target pool stripe corresponding to the second index entry;

determining, based on the second index entry and the total quantity, a reference quantity of logical blocks in the target pool stripe available for use in the plurality of logical blocks;

storing data in the reference quantity of disk blocks in the target pool stripe in sequence; and updating the second index entry and an index entry of a next pool stripe of the target pool stripe based on the storage.

15. The electronic device according to claim 14, wherein the actions further comprise:

transferring, after the second set of disks is added to the disk pool, data in the disk pool to evenly store the data in the first set of disks and the second set of disks in the disk pool if determining that there is no access operation.

16. The electronic device according to claim 15, wherein transferring data in the disk pool comprises:

moving data stored in a pool stripe in the disk pool upward or downward to transfer the data in the disk pool.

17. The electronic device according to claim 10, wherein the actions further comprise:

storing index entries corresponding to the pool stripe in disk blocks of the pool stripe.

18. The electronic device according to claim 10, wherein the plurality of disks in the disk pool each reserve a predetermined size of idle space; and the actions further comprise:

restoring, in response to a disk failure in the disk pool, data blocks stored in the failed disk to the idle space in a disk in use in the disk pool.

19. A computer program product having a non-transitory computer readable medium which stores a set of instructions to process data; the set of instructions, when carried out by computerized circuitry, causing the computerized circuitry to perform a method of:

receiving an access request for a logical block used for storing data, the access request comprising a logical block address for the logical block;

determining, if determining that the logical block address is in a used address space, a first index entry corresponding to the logical block address from a plurality of index entries, the index entry of the plurality of index entries indicating arrangements of a plurality of logical blocks on a corresponding pool stripe, wherein the pool stripe comprises a plurality of disk blocks from a plurality of disks in a disk pool, and data blocks in the plurality of logical blocks form at least one data stripe for a disk array;

determining a target disk block corresponding to the logical block from the plurality of disk blocks based on the first index entry; and processing the access request by using the target disk block;

wherein the index entry comprises an address of a starting logical block located in the pool stripe and a quantity of logical blocks; and wherein determining the first index entry comprises:

determining an address range associated with the index entry based on the address of the starting logical block and the quantity; and determining the index entry as the first index entry if determining that the logical block address is within the address range.

20. A method for processing data, comprising:

receiving an access request for a logical block used for storing data, the access request comprising a logical block address for the logical block;

determining, if determining that the logical block address is in a used address space, a first index entry corresponding to the logical block address from a plurality of index entries, the index entry of the plurality of index entries indicating arrangements of a plurality of logical blocks on a corresponding pool stripe, wherein the pool stripe comprises a plurality of disk blocks from a plurality of disks in a disk pool, and data blocks in the plurality of logical blocks form at least one data stripe for a disk array, the plurality of disks being a first set of disks;

determining a target disk block corresponding to the logical block from the plurality of disk blocks based on the first index entry; and processing the access request by using the target disk block;

responding to receiving a write request after a second set of disks is added to the disk pool, the write request comprising a plurality of ordered logical block addresses for a plurality of logical blocks used for storing data;

determining, if determining that the plurality of ordered logical block addresses are in the used address space, a second index entry corresponding to a first ordered logical block address of the plurality of ordered logical block addresses from the plurality of index entries;

determining, based on the first set of disks and the second set of disks, a total quantity of disk blocks in a target pool stripe corresponding to the second index entry;

determining, based on the second index entry and the total quantity, a reference quantity of logical blocks in the target pool stripe available for use in the plurality of logical blocks;

storing data in the reference quantity of disk blocks in the target pool stripe in sequence; and updating the second index entry and an index entry of a next pool stripe of the target pool stripe based on the storage.

21. The method according to claim 20, further comprising:

transferring, after the second set of disks is added to the disk pool, data in the disk pool to evenly store the data in the first set of disks and the second set of disks in the disk pool if determining that there is no access operation.

* * * * *